(12) United States Patent
Fischer et al.

(10) Patent No.: US 6,238,438 B1
(45) Date of Patent: May 29, 2001

(54) AIRBAG MODULE

(75) Inventors: Anton Fischer, Leinweiler; Martin Seitz; Gitta Wisslicen, both of Gmünd, all of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/319,377

(22) PCT Filed: Oct. 15, 1998

(86) PCT No.: PCT/EP98/06559

§ 371 Date: Jun. 4, 1999

§ 102(e) Date: Jun. 4, 1999

(87) PCT Pub. No.: WO99/19174

PCT Pub. Date: Apr. 22, 1999

(30) Foreign Application Priority Data

Oct. 15, 1997 (DE) ................................. 297 18 305

(51) Int. Cl.[7] ................................................. B60R 21/16
(52) U.S. Cl. ..................... 730/728.2; 280/730.2; 280/743.1
(58) Field of Search ............................. 280/728.1, 728.2, 280/730.1, 730.2, 743.1, 743.2

(56) References Cited

U.S. PATENT DOCUMENTS

| | | | | |
|---|---|---|---|---|
| 5,791,683 | * | 8/1998 | Shibata et al. | 280/730.2 |
| 6,022,044 | * | 2/2000 | Cherry | 280/730.2 |
| 6,082,761 | * | 7/2000 | Kato et al. | 280/730.2 |
| 6,095,551 | * | 8/2000 | O'Docherty | 280/730.2 |

* cited by examiner

*Primary Examiner*—Paul N. Dickson
*Assistant Examiner*—Faye M. Fleming
(74) *Attorney, Agent, or Firm*—Tarolli, Sundheim, Covell, Tummino & Szabo L.L.P.

(57) ABSTRACT

A gas bag module, in particular for head protection in case of a side impact, has an elongated mounting housing (10) having two opposing side walls (12, 14) running spaced apart from each other and a cross-piece (16) connecting the side walls (12, 14), and has a gas bag (20) accommodated in folded state in the mounting housing (10). Further provided is at least one spacer spaced apart from the cross-piece (16), which spacer extends between the side walls (12, 14) and connects them with each other such that a moving apart of the side walls (12, 14) is at least largely avoided when the mounting housing (10) is open and the gas bag (20) unfolds.

18 Claims, 4 Drawing Sheets

Figure 1:
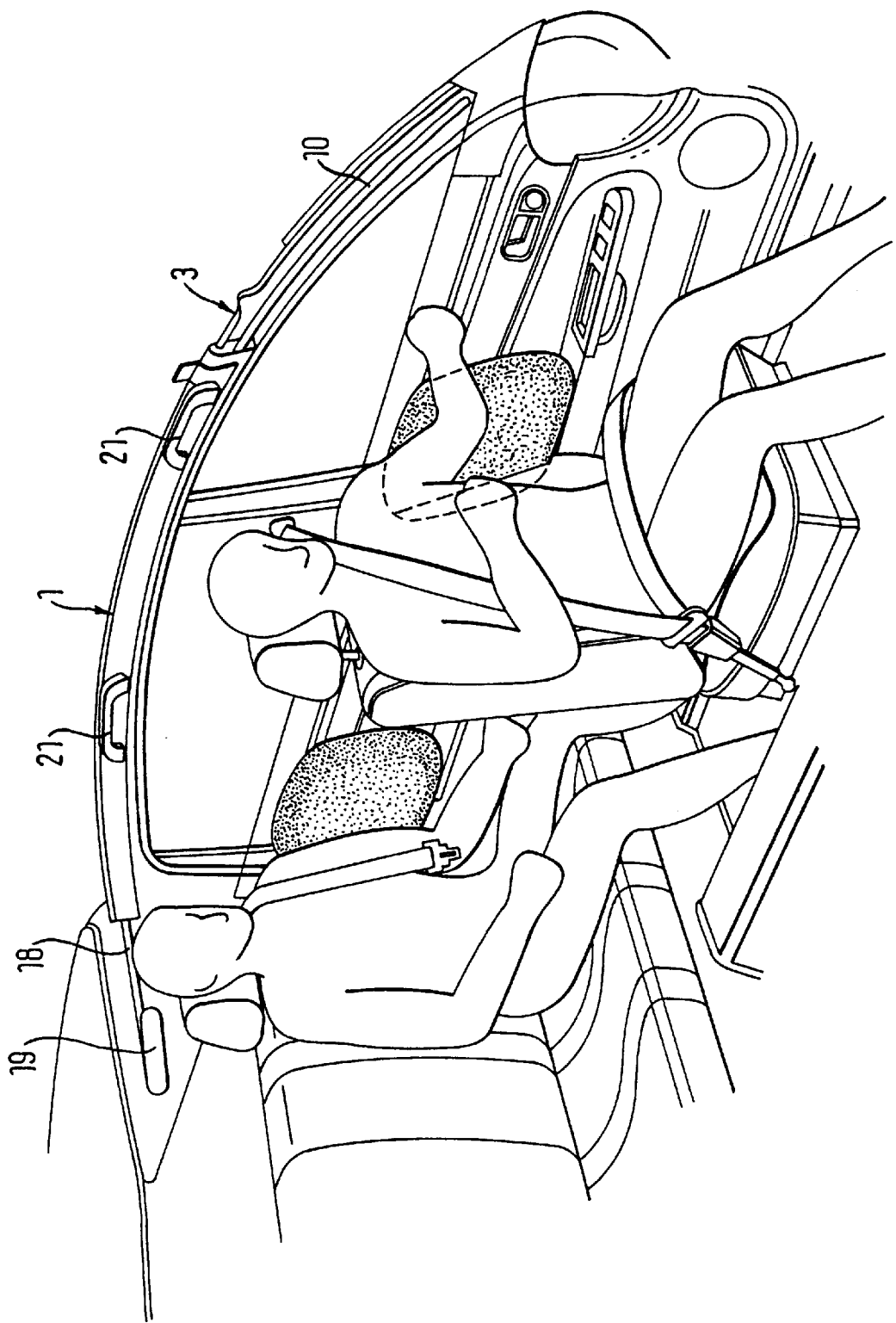

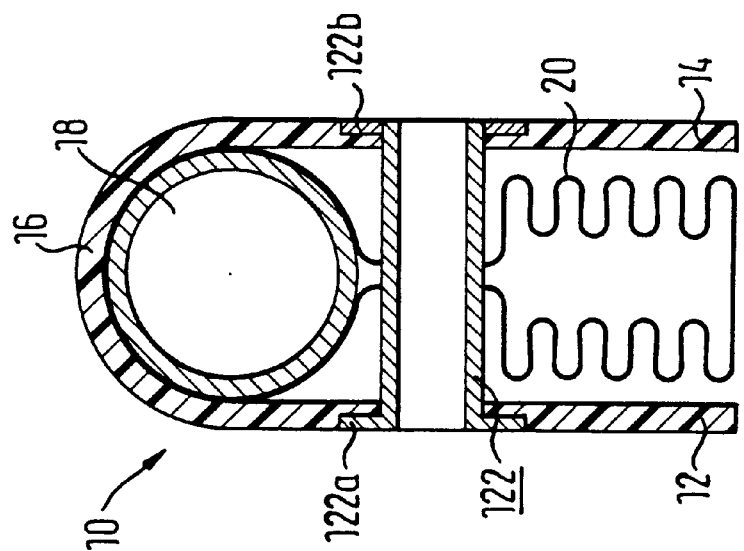
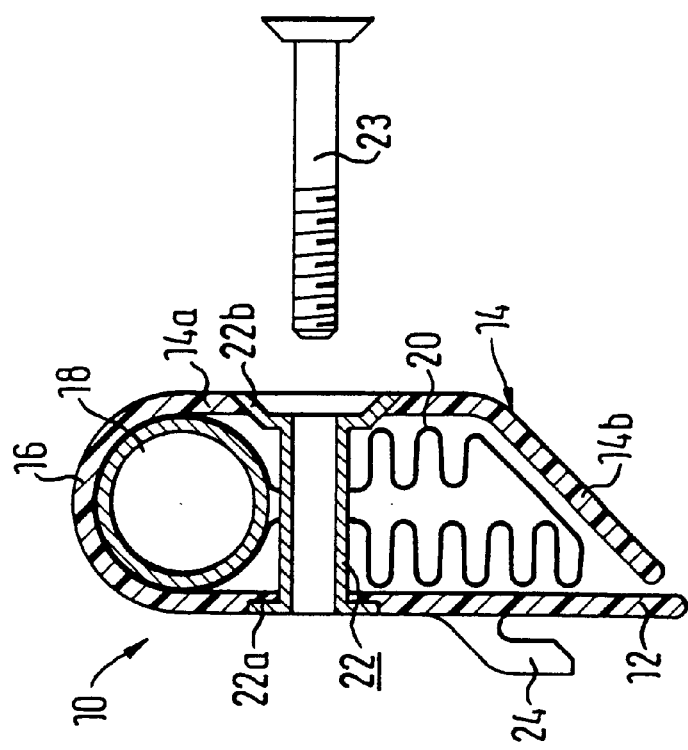

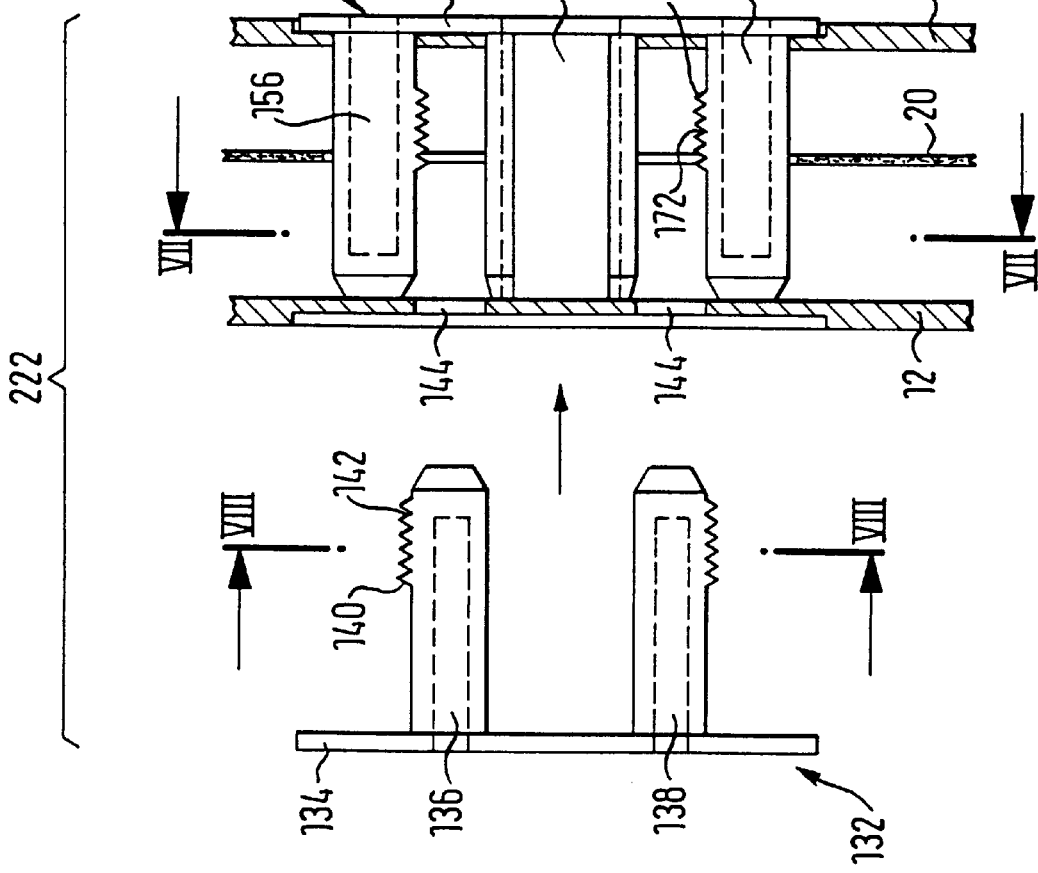

AIRBAG MODULE

The invention relates to a gas bag module, in particular for head protection in case of a side impact, with an elongated mounting housing which has two opposing side walls running spaced apart from each other and has a cross-piece connecting the side walls, and with a gas bag accommodated in folded state in the mounting housing.

A gas bag module, in particular a lateral gas bag module which is fastened to the roof frame of the vehicle has a mounting housing which must fulfill several functions. On the one hand it is to accommodate and protect the folded gas bag and on the other hand the mounting housing is to permit a defined unfolding in the case of a vehicle accident. For this, side walls are provided running spaced apart from each other, which define a so-called ejection channel. The gas bag, which is possibly accommodated in the ejection channel itself, unfolds along the ejection channel or, vice versa, the ejection channel provides the unfolding direction at least at the start of the unfolding process. It is therefore important that the ejection channel has a defined form during unfolding. Furthermore, the mounting housing is also to have a geometry which is able to be determined in advance as far as possible in the pre-mounted state, so that no problems occur in the fitting of the gas bag module in the vehicle because of constantly changing dimensions with gas bag modules to be employed and installed in succession. Mounting containers for so-called head/lateral gas bags are also known, which slide in a manner similar to a curtain in front of the side windows. These have a substantially U-shaped mounting housing which is screwed onto the roof frame. At the open end of the "U" a flap is provided which opens during the unfolding process and permits the emergence of the gas bag. The mounting housing widens on unfolding of the gas bag, so that the ejection channel does not have a width which can be predetermined exactly.

The invention provides a gas bag module in particular for head protection in a side impact in the head region, which has between the side walls a ejection channel which is able to be predetermined exactly in its dimensions even with the unfolding of the gas bag. This is achieved in a gas bag module of the type initially mentioned by at least one spacer which is spaced apart from the cross-piece and which extends between the side walls and connects them with each other such that a moving apart of the side walls is at least largely avoided when the mounting housing is open and the gas bag unfolds. In the gas bag module according to the invention, the spacer is also still present during the unfolding process. In a mounting housing only with flaps, however, these no longer serve for holding the side walls together after the flaps have been opened.

According to the preferred embodiment, the spacers are still provided before the fastening of the module to the vehicle, in order to prevent a moving apart. This means, for example, that the fastening means for arresting the module on the vehicle does not have to be part of the spacer or must serve to fix the side walls in position with respect to each other. For this, the spacer is provided on each of its two axial ends with a collar by which it lies externally against the associated side wall.

The spacer can be formed on the side walls or on only one side wall or preferably can be constructed as a separate body which is able to be fastened to the mounting housing. This is necessary in particular when the mounting housing of plastic and the holding forces on unfolding of the gas bag must be so great that the spacers of plastic would not be able to cope with these stresses, so that spacers of metal have to be used.

The preferred embodiment makes provision that the spacer is constructed as a spacer sleeve or comprises a spacer sleeve, through which a fastening means extends for arresting the gas bag module on the vehicle. In this case, the spacer has numerous functions. It serves to fix the side walls in position with respect to each other, it serves as a guide for the fastening means which projects through on fitting, and it serves as a protective sleeve between the sharp-edged fastening means usually consisting of metal, and the gas bag. Finally, it prevents a pressing together of the mounting housing on arresting, usually screwing the mounting housing on the vehicle. If in fact the mounting housing is screwed onto the roof frame, then this screw could be turned more or less deeply into the roof frame with the consequence that the mounting housing and the gas bag accommodated therein are pressed together. This could distinctly impair the unfolding process. The spacer sleeve, however, forms an axial stop for the screw.

If the mounting housing runs along a portion of the roof frame of the vehicle and a lateral gas bag is accommodated in it, which in the unfolded state covers at least part of a side window of the vehicle, preferably several spacers are provided over the length of the mounting housing, which penetrate the gas bag. In the region of the spacers, the gas bag is sealed to the exterior, so that no leakage currents occur. Preferably, the invention provides a gas bag module which runs along the roof frame, is fastened thereto and extends from at least laterally of the front occupant of the vehicle to laterally of the rear occupant of the vehicle, i.e. contains a so-called ABC gas bag.

The spacer sleeves can also serve to accommodate the fastening bolts for screwing the handle to the roof frame. These fastening bolts serve both for arresting the handle and also that of the gas bag module.

Furthermore, in this embodiment preferably a gas inlet pipe is accommodated in the mounting housing, which is provided between the side walls, the cross-piece and the spacer. The spacer or spacers therefore serve to fix in position the gas inlet pipe in the pre-assembled state and in the arrested state of the gas bag module on the vehicle.

A simple fitting of the gas bag module together with the spacer is made possible in that the spacer consists of several individual parts which can be pushed axially into each other and in the mounted state are fastened to each other by a detent connection.

If each individual part is associated with a side wall and is detachably secured thereto and also projects toward the other side piece and lies with its end face against this other side piece, a moving of the side walls towards each other and also a moving apart from each other is prevented, because each side wall is clamped between collar and end face.

Each individual part has a mounting opening in the side wall associated with it, through which it is inserted from the exterior. The load connection is provided between the side walls on the individual parts.

Further features and advantages of the invention will be apparent from the following description and from the following drawings to which reference is made.

Figure 5:
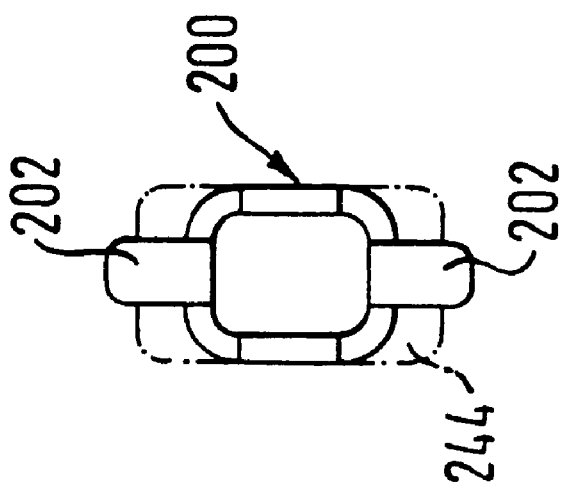
Figure 4:
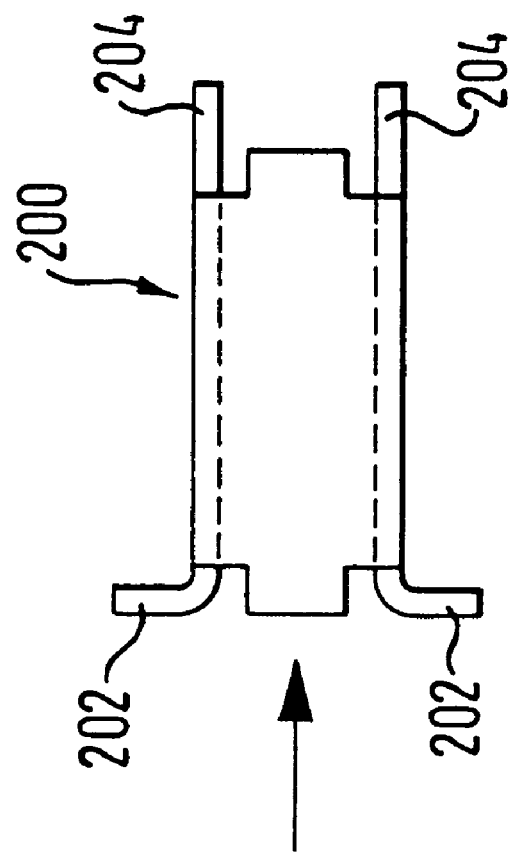

FIG. 1 shows a vehicle interior with a head gas bag module according to the invention, which is arrested on the roof frame and equally protects the front and rear occupants of the vehicle, FIG. 2 shows a cross-sectional view through the gas bag module shown in FIG. 1 according to a first embodiment, FIG. 3 shows a cross-sectional view through the gas bag module shown in FIG. 1 according to a second embodiment, FIG. 4 shows a side view of a spacer constructed as a steel sleeve which characterizes a third embodiment, FIG. 5 shows a view of the steel sleeve shown in FIG. 4, in the arrow direction, FIG. 6 shows a cross-sectional view through the gas bag module shown in FIG. 1 according to a fourth embodiment, the spacers being not yet assembled, FIG. 7 shows a sectional view along the line VII—VII through an individual part according to FIG. 6, and FIG. 8 shows a sectional view along the line VIII—VIII through another individual part according to FIG. 6.

In FIG. 1 a gas bag module 1 is illustrated, which is fastened to a roof frame 3 of a vehicle and has an elongated curved shape following the roof frame. The gas bag module extends in the vehicle between the A and the C pillars. Of course, it is not necessary to cover the entire area of the side windows between the A and C pillars with an inflatable gas bag, which is part of the gas bag module, in the case of restraint.

An essential component of the module is an elongated mounting housing 10 which has a substantially U-shaped cross-section. Details of the cross-sectional shape of the mounting housing 10 can be seen from FIG. 2. The mounting housing consists of a first, flat side wall 12, a second opposite side wall 14, which consists of a first flat strip 14a and a second angled strip 14b adjoining thereto, and a cross-piece 16 connecting the two side walls. The cross-piece 16 is curved and is adapted to the outer contour of a gas inlet pipe 18 which lies against the inner face of the cross-piece 16 and runs over almost the entire length of the mounting housing 10. In FIG. 1 the front part of the mounting housing is illustrated cut open, in order to make the gas inlet pipe 18 visible. Reference number 19 designates a gas generator accommodated in the region of the C pillar, which introduces gas into the pipe 18. The strip 14a runs parallel to the side wall 12, whilst the strip 14b runs obliquely towards the free edge of the side wall 12. The mounting housing 10 is preferably produced by injection molding from a thermoplastic plastic. This ensures optimum mechanical characteristics, with an easy and systematic manufacturing in series, in particular a reproducible behavior with regard to rigidity and elastic deformation over a wide temperature range.

Inside the mounting housing 10, a lateral gas bag 20 is stowed in folded state. In this state, the gas bag 20 is held by the strip 14b of the second housing wall 14. This forms a deflectable closure cap, the rigidity of which, however, even without direct connection with the opposite side wall 12, ensures that the folded gas bag 20 remains enclosed. Between the side walls 12 and 14, more precisely between the side wall 12, the strip 14a and the folded-out strip 14b, a ejection channel is formed which establishes the unfolding direction of the gas bag 20 at the start of the unfolding process.

For fitting the mounting housing in the vehicle, advantageously use is made of the fastening means, required and present in any case, for two handles 21 (cf. FIG. 1). The handles 21 are usually fastened by screw bolts 23 on the roof frame of the vehicle. In order to make possible the passage of the fastening means transversely through the mounting housing 10, two spacer sleeves 22 are provided for each handle, which pass through the mounting housing 10 perpendicularly to the side wall 12 and the strip 14a. Both axial ends of the spacer sleeve 22 have a collar 22a or respectively 22b, by which they lie externally against the associated side wall 12, 14. The collar 22a is produced by caulking the axial end of the spacer sleeve after passing through a mounting opening in the strip 14a and the side wall 12. The spacer sleeve 22 forms a spacer which receives the axial forces in the screw bolt 23, which is guided through this sleeve and serves to fasten the mounting housing 10 under the roof edge and also to fasten the handles shown in FIG. 1. A further function of the numerous spacer sleeves 22 provided along the mounting housing 10 consists in keeping the gas inlet pipe 18 in abutment against the inner face of the bent cross-piece 16, the shape of which is adapted to that of the gas inlet pipe 18. The spacer sleeves 22 also prevent the side walls from moving apart on unfolding of the gas bag owing to the gas bag pressure and hence no longer being able to provide any direction to the unfolding process.

To facilitate the fitting, hook-shaped suspension elements 24 are formed on the exterior of the side wall 12.

The gas bag in the activated, inflated state extends from the A pillar via the B pillar up to the C pillar in the vehicle and predominantly in the regions in which there is an endangering of the front and rear vehicle occupants in the head area in the case of the side impact. The length of the mounting housing 10 is adapted to the longitudinal extension of the gas bag 20.

The gas bag itself has sealed recesses in the region of the spacer sleeves 22, so that the spacer sleeves 22 can extend through them. The gas bag 20 is, furthermore, looped at its upper edge around the gas inlet pipe 18 and is clamped between the latter and the cross-piece 16.

In the embodiment shown in FIG. 3, the parts corresponding to each other compared with FIG. 2 are also provided with the reference numbers already given. The spacer sleeve in this case, however, is composed of several parts, namely of a sleeve 122 with a collar 122a and with a disc 122b placed in the region of the side wall 14 onto the corresponding end of the spacer sleeve and connected with the sleeve 122. The side wall 14, in contrast to the embodiment according to FIG. 2, does not have an angled strip 14b. Hence, the ejection channel is formed by the two parallel side walls 12 and 14. Just as in the embodiment according to FIG. 2, the spacer sleeves 122 form spacers to establish the spacing of the side walls 12, 14. Also in this embodiment, the fastening means, such as for example a screw, is able to be inserted from the exterior through the spacer sleeve 122. In contrast to the embodiment according to FIG. 2, the disc 122b, however, does not have a depression to accommodate the head of the fastening screw.

In the embodiment shown in FIG. 4, the spacer sleeve 200 is constructed as a steel sleeve in a single piece. The steel sleeve is not round in cross-section, but rather is elongated, almost oval and is bent from a stamped piece. The spacer sleeve has at each axial end two opposing tongues 202 and 204. The tongues 202 are already angled before the introduction into the mounting openings 244 (cf. FIG. 5) in the side walls 12, 14, whereas the tongues 204 are only angled after the introduction into the mounting openings 244. The tongues 202 and 204 have the function of the collar 22a or respectively of the collar 22b according to FIG. 2 or of the collar 122a or respectively of the disc 122b acting as a collar. They therefore represent almost a collar which is not continuous circumferentially. The elongated cross-sectional form of the spacer sleeve offers the advantage that spacing tolerances between the fastening openings on the roof frame, which can amount to a few millimeters from opening to opening and vehicle to vehicle, can be balanced out. The screw bolt 23, owing to the oval cross-sectional shape, can be displaced in longitudinal direction of the mounting housing 10 in the spacer sleeve 200. The spacer sleeve 22 is accordingly mounted in the outer housing 10 so that its longer side walls run in longitudinal direction of the outer housing, i.e. in the direction of the roof frame.

Furthermore, it is also possible that the mounting opening 244 in each side wall 12, 14 is constructed as an oblong hole in which the spacer sleeve can be pushed within certain limits. This also provides a possibility for balancing out tolerance. Here, a combination of a mounting opening in the form of an oblong hole with each embodiment of the spacer sleeve which is shown is possible. In addition, to provide a tolerance equalization also a distinct excess dimension can be provided between the external diameter of the screw bolt 23 and the narrowest internal diameter of the spacer sleeve 22, 122 or 200.

The mounting opening 244, however, does not have to be an oblong hole. To create the possibility of tolerance balancing, it is merely important that it is greater than the external diameter of the spacer sleeve 200, so that the spacer sleeve 200 can be displaced in a plane defined by the mounting opening 244, i.e. transversely to its longitudinal extent, and the tongues 202 and 204 still lie against the outer faces of the side walls 12 and 14.

The embodiment shown in FIGS. 6 to 8 is distinguished by an even simpler fastening of the spacer sleeve on the outer housing. The spacer 222 consists of two individual parts which are associated respectively with a side wall 12, 14 and which are fastened detachably therein. For this, they are inserted from the exterior into a corresponding mounting opening in the associated side wall. The individual part 232 has a plate 134 corresponding in function to the collar 22a, from which two fingers 136, 138 project perpendicularly and in axial direction or in the joint direction (cf. arrow). The fingers 136 and 138, just like the plate 134, are of plastic and in addition are radially flexible. They have on their outer face in a particular section teeth 140 and recesses 142, which lie between two adjacent teeth 140. These teeth 140 and recesses 142 form a part of a detent connection. The side wall 12 not only has a depression for the mounting of the plate 134, but also two mounting openings 144, into which the fingers 136, 138 are introduced on insertion of the individual part 132 in the arrow direction. The second individual part which is illustrated in FIG. 6 already inserted into corresponding openings in the side wall 14, bears reference number 152. This individual part likewise comprises a plate 154 and also three projecting fingers, namely two radially elastically resilient outer fingers 156 and 158 and also a central sleeve-shaped finger 160. The sleeve-shaped finger 160, as can be seen in FIG. 7, is hollow in construction and forms a spacer sleeve to receive a fastening screw. Between the fingers 156 and 160 or 158 and 160, intermediate spaces are formed into which the fingers 136, 138 penetrate when the two individual parts 132 and 152 are pushed axially into each other. On the inner face, the fingers 156 also have successive teeth and recesses 170, 172. Through the teeth 140, 170 and the recesses 142, 172 a detent connection is formed, which serves to fasten the individual parts 132 and 152. On introduction of the individual part 132 in the direction of movement, the fingers 156, 158 yield radially outwards, so that the teeth on the fingers 136, 138, 156 and 158 can intermesh.

As can be seen in FIG. 6, the fingers 156, 158 and 160 are so long that they strike on the end face against the inner face of the end wall 12. The fingers 136 and 138 are correspondingly long after introduction into the openings 144, so that they lie on the end face against the inner face of the end wall 14. Thereby, the end walls 12, 14 are fixed in position in both directions, because the spacer 222 prevents a pressing together of the walls 12, 14 and also a moving apart thereof. By means of the detent connection, the side walls 12, 14 also can not be pressed apart with the pre-mounted gas bag module by the folded gas bag 20. The individual parts 132, 152 which are connected with each other can only offer a certain maximum force against a pressing apart of the side walls 12, 14. This force depends on the type of detent connection and also on the elasticity of the fingers. If this force is exceeded on unfolding, the fastening screws are still present, however, which project through the sleeve-shaped finger 160. For this instance, these form a part of the spacer 222 and represent a type of securing means.

The embodiment shown in FIGS. 6 to 8 is distinguished by a quick, simple type of connection of the individual parts on closure of the mounting housing 10. No further plastic deformation has to take place after the connecting of the individual parts 132, 152.

What is claimed is:

1. A gas bag module for use in a vehicle, for head protection in case of a side impact,
    with an elongated mounting housing (10), which has two opposing side walls (12, 14) running spaced apart from each other and has a cross-piece (16) connecting the side walls (12, 14), and
    with a gas bag (20) accommodated in folded state in the mounting housing (10),
    characterized by at least one spacer spaced apart from the cross-piece (16),
    which spacer extends between the side walls (12, 14) and connects them with each other such that a moving apart of the side walls (12, 14) is at least largely avoided when the mounting housing (10) is open and the gas bag (20) unfolds.

2. The gas bag module according to claim 1, characterized in that before the module is fastened to the vehicle, the spacer (222) prevents the side walls from moving apart.

3. The gas bag module according to claim 2, characterized in that each side wall (12, 14) has an outer and an inner face and the spacer has on each of its axial ends a collar by which it lies externally against the associated side wall (12, 14).

4. The gas bag module according to claim 1, characterized in that the spacer (222) is constructed as a body which is separate with respect to the mounting housing (10) and is able to be fastened to the mounting housing (10).

5. The gas bag module according to claim 1, characterized in that the spacer comprises a spacer sleeve (22; 122; 200) through which a fastening means extends for arresting the gas bag module on the vehicle.

6. The gas bag module according to claim 5, characterized in that the fastening means can be inserted from a side wall through the spacer sleeve (22; 122; 200).

7. The gas bag module according to claim 5, characterized in that the spacer sleeve (200) has an elongated cross-section.

8. The gas bag module according to claim 1, characterized in that in the side walls (12, 14) a mounting opening (244) is provided, into which the spacer can be inserted, and that the spacer can be displaced in the mounting opening (244) to balance out positional tolerances in the plane of the mounting opening (244).

9. The gas bag module according to claim 1, characterized in that the mounting housing (10) extends along part of a roof frame of a vehicle and in it a lateral gas bag is accommodated, which in the unfolded state covers at least part of a vehicle side window, several spacers (222) being provided over the length of the mounting housing, which penetrate the gas bag (20).

10. The gas bag module according to claim 9, characterized in that the gas bag module runs along the roof frame of the vehicle, is fastened thereon and extends from at least laterally of the vehicle front occupant to laterally of the vehicle rear occupant.

11. The gas bag module according to claim 10, characterized in that the spacers comprise spacer sleeves (22; 122; 200) and that handle fastening bolts extend through two spacer sleeves (22; 122; 200) in the arrested state of the gas bag module in the vehicle.

12. The gas bag module according to claim 9, characterized in that in the mounting housing (10) a gas inlet pipe is accommodated following the longitudinal extent of the mounting housing, which pipe is provided between the side walls (12, 14), the cross-piece (16) and the spacer (222) and runs inside the gas bag (20).

13. The gas bag module according to claim 1, characterized in that the spacer (222) has several individual parts (132, 152) which can be pushed axially into each other and in the mounted state are fastened to each other by a detent connection.

14. The gas bag module according to claim 13, characterized in that each individual part (132, 152) is associated with a side wall (12, 14) and is fastened to it and also projects toward the other side wall (12, 14) and lies against it on the end face.

15. The gas bag module according to claim 13, characterized in that each individual part (132, 152) extends through a mounting opening (144) in the side wall (12, 14) associated therewith, through which it is inserted from the exterior, and that the detent connection is provided between the side walls (12, 14) on the individual parts (132, 152).

16. The gas bag module according to claim 13, characterized in that the individual parts (132, 152) extend toward the opposite side wall (12, 14) and have elastically flexible fingers (136, 138, 156, 158, 160) in radial direction with teeth (140, 170) and recesses (142, 172), the teeth and recesses forming the detent connection.

17. The gas bag module according to claim 16, characterized in that one of the fingers (160) is constructed as a sleeve through which a fastening means can be inserted from the exterior for arresting the gas bag module on the vehicle.

18. The gas bag module according to claim 17, characterized in that on the individual part which has the sleeve-shaped finger (160) further fingers (156, 158) are formed and between these and the sleeve-shaped finger (160) fingers (136, 138) of the other individual part are clamped.

* * * * *